United States Patent [19]
Masaitis

[11] 3,789,958
[45] Feb. 5, 1974

[54] VEHICLE SUPPORT
[75] Inventor: Theodore J. Masaitis, Fairview Park, Ohio
[73] Assignee: Wyle Laboratories, El Sequndo, Calif.
[22] Filed: Oct. 2, 1972
[21] Appl. No.: 294,094

[52] U.S. Cl. .............................................. 187/8.49
[51] Int. Cl. ............................................ B60s 13/00
[58] Field of Search ....... 187/8.41, 8.47, 8.49, 8.54, 187/8.65

[56] References Cited
UNITED STATES PATENTS
2,456,646  12/1948  Patterson ........................... 187/8.49
2,552,974  5/1951  Johnson .............................. 187/8.54
3,088,547  5/1963  MacMillan ..................... 187/8.49 X
3,724,602  4/1973  Hernick ............................. 187/8.49

*Primary Examiner*—Allen N. Knowles
*Attorney, Agent, or Firm*—Fay, Sharpe and Mulholland

[57] ABSTRACT

An auxiliary vehicle support for use with a drive-on type of vehicle hoist selectively supports the vehicle from its undercarriage with its tires above the hoist tracks. The auxiliary vehicle support is swingable between a substantially vertical supporting position and a substantially horizontal storage position.

19 Claims, 4 Drawing Figures

VEHICLE SUPPORT

BACKGROUND OF THE INVENTION

This application pertains to the art of supports and more particularly to vehicle supports. The invention is particularly applicable for use with drive-on type of vehicle hoists and will be particularly described with reference thereto. However, it will be appreciated that the invention has broader applications and may be used for other purposes.

Vehicle hoists of known construction include the free-wheel type and the drive-on type. The free-wheel type of hoist includes rails or other vehicle engaging supports for selectively engaging parts on the vehicle undercarriage. The supports may engage such parts as the vehicle axle, ball joint rods, frame, or any other suitable parts. The vehicle engaging supports are raised and lowered by operation of a pneumatic cylinder. Hoists of this type enable performance of work or tests on the vehicle wheels. However, this type of hoist requires rather accurate positioning of the vehicle so that it will be balanced on the supports. In addition, proper positioning of the vehicle supports is necessary. Hoists of this type sometimes interfere with other tasks performed on the undercarriage of the vehicle.

The drive-on type of hoist includes a pair of spaced-apart parallel tracks onto which the vehicle is driven. The tracks are raised and lowered by operation of a pneumatic cylinder or the like. Lifts of this type are very convenient and do not interfere with such operations as greasing or changing oil, or performing certain other repairs on the undercarriage of the conveyance. However, the drive-on type of hoist does not allow performance of work or tests on the vehicle wheels because the tires are always engaging the tracks. The tracks also interfere with certain other repairs or tests which must be carried out from beneath the vehicle.

Many devices have been proposed for converting drive-on type of hoists to the free-wheel type. Such devices enable normal use of the hoist as a drive-on type. When work is to be done on the wheels, or when the tracks would interfere with certain tasks, an auxiliary supporting device mounted on the hoist tracks is selectively operable to engage parts on the vehicle undercarriage and raise the vehicle so that its tires are above the hoist tracks.

Previous auxiliary devices of the type described for addition to drive-on type of hoists include hydraulic or pneumatic cylinders which are supported by the hoist tracks and can be operated to engage parts on the vehicle undercarriage for raising the vehicle tires off the tracks. Hydraulic or pneumatic cylinders for this auxiliary purpose are very expensive. Pneumatic cylinders also require a connection to a source of pressurized air.

Other auxiliary devices of the type described include vertical posts attachable to the hoist tracks. With the hoist raised, the posts are positioned so that they depend downward from the tracks. When the hoist is lowered, the bottom ends of the posts engage a supporting surface beneath the hoist tracks, and the upper ends of the posts engage parts on the vehicle undercarriage. As the hoist tracks continue to fall downwardly relative to the posts, the vehicle will remain suspended on the posts. Locking pins or the like are then positioned to prevent downward movement of the posts relative to the hoist tracks. The hoist can again be raised and the vehicle remains suspended on the posts with its tires out of engagement with the hoist tracks. Previous auxiliary supporting devices of this type often require considerable assembly each time the auxiliary support is used. Storage of such auxiliary devices is also a problem.

SUMMARY

An auxiliary vehicle supporting device for use with drive-on vehicle hoists of the type described is selectively swingable relative to the hoist tracks between a substantially vertical operative position and a substantially horizontal storage position.

In accordance with one arrangement, the auxiliary supporting device includes carrier means spanning the hoist tracks. A pair of elongated post members are slidably carried by the carrier means for longitudinal sliding movement relative to the carrier means. The posts have bottom ends which are engageable with a supporting surface, and upper ends having vehicle engaging means thereon for engaging parts of a vehicle undercarriage. Locking means is provided for locking the post members against downward movement relative to the carrier means with the vehicle engaging means positioned selectively variable distances above the carrier means.

Mounting means is provided for mounting the carrier means to the hoist tracks. In a preferred arrangement, the carrier means is swingable relative to the mounting means for positioning the post members substantially vertical or substantially horizontal. Selective locking means is provided for locking the carrier means against swinging movement relative to the mounting means with the posts in either position.

In accordance with another aspect of the device, the mounting means mounts the auxiliary support to the hoist track for horizontal movement of the carrier means relative to the tracks. Retaining means is provided for selectively and releasably retaining the carrier means and mounting means against horizontal movement relative to the hoist tracks. In one arrangement, the retaining means comprises a wedge member carried by the mounting means and shiftable into engagement with a surface on the track for preventing movement of the mounting means relative to the track.

In accordance with a preferred arrangement, the vehicle engaging means on the upper ends of the post members are reciprocatable transversely of the hoist tracks so that they can be positioned for engaging a desirable part on the vehicle undercarriage. In one arrangement, the upper end of the post members are connected by connecting cross brace means above the carrier means. The connecting cross brace means includes opposite outwardly opening slide sockets slidably receiving elongated slide bars on the vehicle engaging means.

In accordance with another aspect of the device, the arrangement for obtaining swinging movement of the carrier means relative to the mounting means includes outwardly opening sockets on the opposite end portions of the carrier means. The mounting means includes projections received in the sockets. In one arrangement, the locking means for locking the carrier means to the mounting means with the posts either vertical or horizontal includes aligned pin receiving holes in the sockets and the projections.

In accordance with another aspect of the device, certain of the pin receiving holes in at least one of the socket or projection members are laterally elongated for allowing limited reciprocal movement of the projections relative to the sockets when a pin is received in the aligned pin receiving holes.

In a preferred arrangement, the mounting means includes rollers receivable in outwardly opening channel members attached to the opposite facing inner surfaces of the hoist tracks. The auxiliary supporting device is shiftable along the tracks on the rollers. The described laterally elongated slots allow some adjustment when the tracks are out of alignment or are spaced-apart different distances on different hoists.

It is a principle object of the present invention to provide an improved auxiliary supporting device for converting a drive-on type of vehicle hoist into a free-wheeling type of hoist.

It is also an object of the present invention to provide such an auxiliary vehicle support which is economical to manufacture and simple to operate.

It is a further object of the present invention to provide an auxiliary vehicle support of the type described which can be placed in a storage position on the vehicle hoist so that it will not interfere with normal operation of the drive-on type of hoist.

It is an additional object of the present invention to provide an auxiliary supporting device of the type described with selectively operable retaining means for releasably retaining the device against movement relative to hoist tracks.

BRIEF DESCRIPTION OF THE DRAWINGS

The invention may take form in certain parts and arrangements of parts, a preferred embodiment of which will be described in detail with respect to the accompanying drawings which form a part hereof.

DESCRIPTION OF A PREFERRED EMBODIMENT

Figure 1:
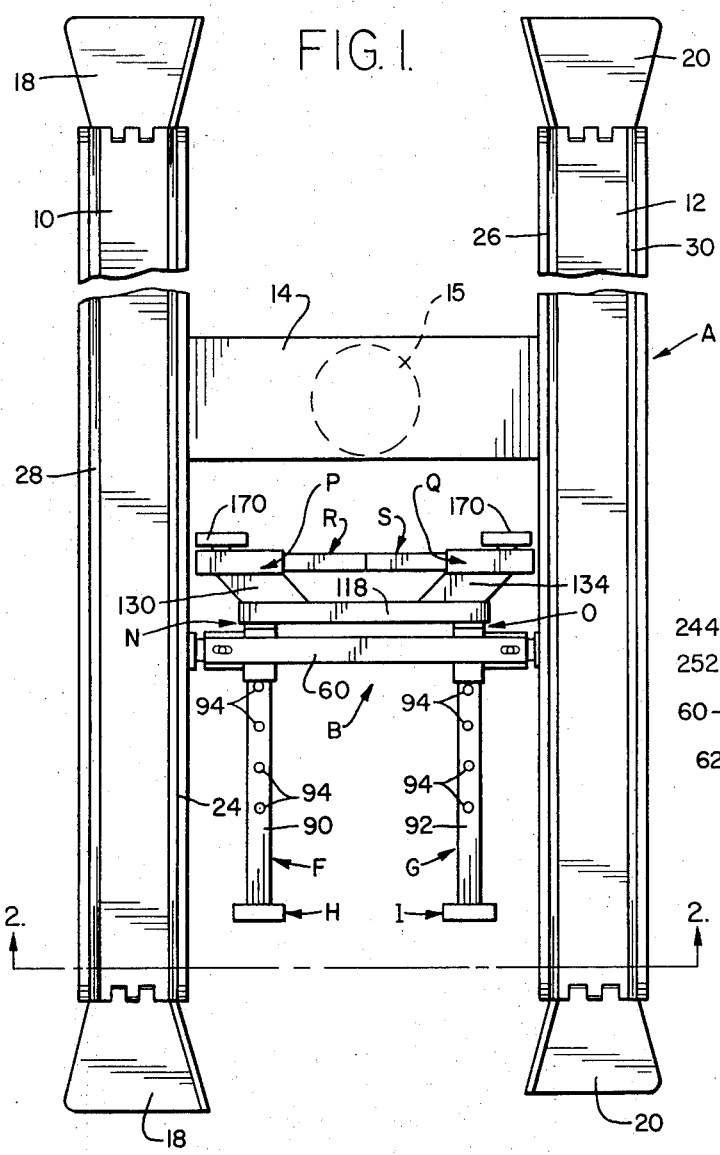
FIG. 1 is top plan view showing a drive-on type of vehicle hoist having the auxiliary vehicle supporting device of the present invention incorporated therein.

Referring now to the drawings, wherein the showings are for purpose of illustrating a preferred embodiment of the invention only and not for purposes of limiting same, FIG. 1 shows a drive-on type of vehicle hoist A. Hoist A may be of any conventional and well known type, and will only be generally described.

Hoist A includes a pair of substantially spaced-apart tracks 10 and 12. A central transverse frame member 14 connects tracks 10 and 12, and is itself mounted on the rod 15 of a pneumatic cylinder or the like. The pneumatic cylinder is operable in a known manner for raising and lowering hoist A. Tracks 10 and 12 may have downwardly inclined ramps 18 and 20 hingedly connected thereto in a known manner and lockable in a raised position for preventing rolling movement of a vehicle from tracks 10 and 12. A vehicle is adapted to be driven onto hoist A with its tires in engagement with tracks 10 and 12. Tracks 10 and 12 include inner side members 24 and 26, and outer side members 28 and 30. Inner side members 24 and 26 have spaced-apart opposed facing inner surfaces 31 and 32.

In accordance with one arrangement, elongated substantially U-shaped channel members 34 and 36 are secured to inner surfaces 31 and 32 as by welding. It will be recognized that channel members 34 and 36 may be secured to tracks 10 and 12 in other ways if so desired. In the arrangement shown, welds 40 secured channel members 34 and 36 to inner surfaces 31 and 32 of inner walls 24 and 26 on tracks 10 and 12. Elongated channel members 34 and 36 may extend substantially the full length between hinged ramps 18 and 20, and transverse frame member 14. Each channel 34 and 36 opens outwardly as at 44 and 46 in opposed and facing relationship. Each channel member 34 and 36 has a lower and inner supporting surface 48 and 50.

In accordance with the present invention, an improved auxiliary supporting device B is mounted on tracks 10 and 12 of hoist A for converting drive-on hoist A into a free-wheel type of hoist.

Figure 3:
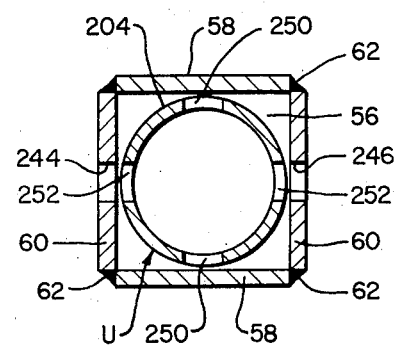
FIG. 3 is a cross-sectional elevational view looking generally in the direction of arrows 3—3 of FIG. 2.

In accordance with one arrangement, auxiliary supporting device B includes carrier means C extending substantially perpendicular to tracks 10 and 12. Carrier means C has opposite end portions defining outwardly opening sockets 54 and 56. In the arrangement shown, each socket 54 and 56 is formed by four rectangular metal plates welded together along their outer edges to provide a square socket. FIG. 3 shows socket 56 formed from spaced-apart plates 58 welded to perpendicularly positioned spaced-apart plates 60. Socket 54 is similarly formed. Welds securing plates 58 and 60 together are generally shown at 62 in FIG. 3.

Carrier means C also includes a pair of spaced-apart parallel rectangular sockets D and E. It will be recognized that sockets D and E may also be circular or have other cross-sectional shapes if so desired. Sockets D and E are formed by welding four rectangular metal plates together as described with respect to plates 58 and 60 in FIG. 3. Sockets D and E have parallel longitudinal axes which extend substantially vertical in the operative position of device B. Sockets D and E include spaced-apart parallel plates 70 welded to perpendicular spaced-apart plates 72 to provide rectangular open sockets 74 and 76 in socket members D and E respectively. Plates 58 may be welded to outer plates 70 as at 80. Carrier means C includes rectangular plates 82 and 84 welded to perpendicular spaced-apart plates 60. Plates 82 and 84 are welded to inner plates 70 of socket members D and E as at 88.

In one arrangement, each socket 74 and 76 slidably receives a cylindrical post member F and G. It will be recognized that post members F and G may also have other cross-sectional configurations if so desired. The only requirement being that post members F and G be slidable relative to sockets 74 and 76. In the arrangement shown, post members F and G are slidably received through rectangular sockets 74 and 76 in substantially the same manner as shown in FIG. 3.

Each post member F and G has a longitudinal axis 90 and 92. Each post member F and G further includes a plurality of spaced-apart holes therethrough as at 94 and 96.

Each post member F and G includes a bottom end having supporting surface engaging shoes H and I thereon for engaging a supporting surface J beneath hoist A. Supporting surface J will normally define a concrete supporting surface of a service area floor or pit. The bottom end portions of post members F and G having shoes H and I thereon depend downwardly from tracks 10 and 12.

Each post member F and G includes an upper end having vehicle engaging means K and L thereon. A connecting cross brace member M connects post members F and G above carrier means C. Connecting cross brace member M includes downwardly opening rectangular sockets N and O. Sockets N and O are formed similarly to the showing in FIG. 3 for plate members 58 and 60. Socket member N includes spaced-apart parallel rectangular plates 102 and 104 welded to perpendicular spaced-apart plates 106. Socket member O includes spaced-apart parallel rectangular plates 108 welded to perpendicularly positioned parallel spaced-apart plates 110. The upper ends of post members F and G are received in sockets 112 and 114 defined by socket members N and O.

Connecting cross brace means M includes spaced-apart parallel rectangular metal plates 118 welded to parallel spaced-apart plates 120 and 122. At least plates 122 are welded to plates 104 and 108 of socket members N and O as at 126. Plate members 118 may also be suitably welded to plate members 106 and 120 of sockets N and O.

In one arrangement, connecting cross brace means M includes substantially parallel spaced-apart rhomboid-shaped metal plate members 130 and 134 suitably welded to plates 118, and to sockets N and O if so desired. Each plate member 130 and 134 is welded or otherwise suitably secured at its upper edge to a substantially U-shaped channel member P and Q. Each channel member P and Q is somewhat elongated and provides an outwardly opening slide socket for slidably receiving substantially U-shaped slide bars R and S. Each channel member P and Q has an upper plate member 140 and 142 secured thereto as by welding adjacent the inner upper opposed portions of socket members P and Q. Each plate member 140 and 142 is suitably bored and threaded for threadably receiving a bolt member 144 and 146 which define stop means for limiting sliding movement of slide bars R and S.

Each elongated slide bar R and S has a substantially U-shaped cross-sectional configuration, and has outer dimensions to be slidably received in channel members P and Q for reciprocating movement transversely of tracks 10 and 12. Each slide bar R and S has a substantially rectangular plate 150 and 152 welded or otherwise suitably secured to the inner end portion thereof to define stop plates. Each slide bar R and S has a rectangular member 156 and 158 welded therein adjacent the outer end portions thereof. Each member 156 and 158 has a vertical hole 160 and 162 therethrough for slidably receiving cylindrical projections 166 and 168 on vehicle undercarriage engaging pads 170 and 172. Vehicle undercarriage engaging pads 170 and 172 may be lifted from sockets 160 and 162 for replacement or for other reasons if so desired. Slide bars R and S are reciprocable relative to slide sockets P and Q substantially perpendicularly to tracks 10 and 12 for properly positioning pads 170 and 172 to engage a desired part on the undercarriage of a vehicle. Stop plates 150 and 152 on slide bars R and S engage the inner ends of stop bolts 144 and 146 to prevent displacement of slide bars R and S from slide sockets P and Q. Stop plates 150 and 152 also insure that an adequate length of slide bars R and S remain in slide sockets P and Q for supporting purposes. Stop bolts 144 and 146 may be threaded out of plates 140 and 142 for removal of slide bars R and S if so desired.

The uppermost edges of post members F and G preferably bear against the bottom surfaces of slide socket channels P and Q. Each plate member 130 and 134 has a hole therethrough aligned with holes in plates 106 and 108 of socket members N and O, and with suitable holes in the upper end portions of posts F and G, for receiving bolts 180 and 182 to secure post members F and G to plate members 130 and 134, and to socket members N and O. This also connects posts F and G by cross brace means M above carrier means C.

Mounting means T and U are provided for mounting auxiliary support device B to tracks 10 and 12. Each mounting means T and U includes a substantially cylindrical tube member 202 and 204 slidably received with sockets 54 and 56 on carrier means C for reciprocating movement relative thereto. Each tubular member 202 and 204 is welded as at 210 to a mounting plate 212 and 216. Each mounting plate 212 and 216 has suitable holes therethrough receiving stub shafts 218 which are welded as at 220 to mounting plates 212 and 216.

Stub shafts 218 have rollers 224 rotatably mounted thereon and received within openings 44 and 46 of channel members 34 and 36. Rollers 224 ride upon lower supporting surfaces 48 and 50 of channel members 34 and 36. With the arrangement described, auxiliary supporting device B may roll horizontally relative to tracks 10 and 12 toward and away from transverse frame member 14 of hoist A. Each mounting means T and U includes substantially horizontally extending lower plate members 230 and 234 welded to mounting plates 212 and 216 as at 236. EAch member 230 and 234 has another retaining member 238 and 240 secured thereto outwardly of channel members 34 and 36 for preventing inward displacement of mounting means T and U relative to channel members 34 and 36. Channel members 34 and 36 may have open end portions adjacent hinged ramps 18 and 20 for permitting insertion and removal of auxiliary supporting device B. The open end portions of the channels may be closed if so desired by bolts or welded plates once auxiliary supporting device B is positioned on tracks 10 and 12.

The opposite end portions of carrier means C include laterally elongated holes 244 and 246 in plates 60 adjacent sockets 54 and 56. Projections 202 and 204 have opposed holes 250 displaced 90° from opposed holes 252. Pins 260 are receivable within aligned openings 244, 246 and 252; or 244, 246 and 250. With pins 260 received through openings 244, 246 and 252, carrier means C is positioned so that post members F and G extend substantially vertically with surface engaging pads H and I depending from tracks 10 and 12. Pins 260 may be removed for swinging movement of auxiliary support means B relative to projections 202 and 204 on mounting means T and U for positioning carrier means C so that post members F and G extend substantially horizontally and parallel to track members 10 and 12. Pins 260 may then be positioned through holes 244, 246 and 250 for locking auxiliary support means B in a storage position relative to track members 10 and 12.

The aligned holes in sockets 54 and 56, and projections 202 and 204 on mounting means T and U, define latching means for selectively latching carrier means C with post members F and G either in a substantially vertical position or in a substantially horizontal position.

Pins 264 are receivable through holes 96 in post members F and G for preventing downward movement of post members F and G relative to carrier means C with vehicle engaging means K and L positioned selectively variable distances above carrier means C.

Figure 4:
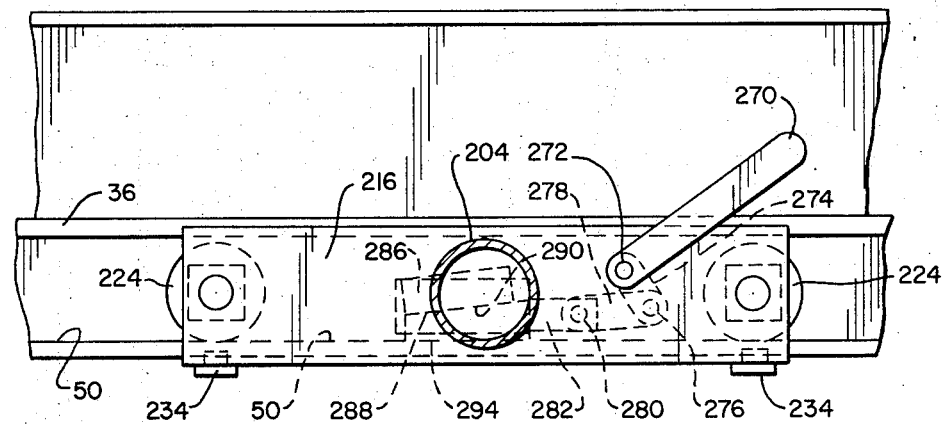
FIG. 4 is a cross-sectional elevational view looking generally in the direction of arrows 4—4 of FIG. 2.

In accordance with a preferred arrangement, retaining means is provided for retaining auxiliary support means B against rolling movement relative to tracks 10 and 12 of hoist A. Lever member 270 is fixed to a pin 272 extending through a suitable hole in mounting plate member 216 Pin 272 is rotatable relative to the hole through plate member 216 and has a link 274 secured thereto on the inner surface of mounting plate member 216. Link 274 is pivotally attached as by pin 276 to another link 278. Link 278 is also pivotally connected as by pin 280 to wedge member 282. The inner surface of mounting plate member 216 has a cam member 286 secured thereto as by welding or the like. Cam member 286 has a downwardly inclined cam surface 288 for cooperation with an upper inclined surface 290 of wedge member 282. Wedge member 282 has a lower surface 294 engageable with surface 50 of channel member 36. As shown in FIG. 4, counterclockwise movement of lever 270 will pull wedge member 282 from between cam surface 290 and surface 50 for allowing free movement of auxiliary support device B. Supporting device B can then freely roll along channel members 34 and 36 relative to tracks 10 and 12 on rollers 224. Clockwise pivotal movement of lever 270 provides a force through link 274 to link 278 for moving wedge member 282 to the left in FIG. 4. The upper surface of wedge member 282 acts against cam surface 290 to force bottom edge 294 of wedge member 282 against surface 50 of channel member 36 for retaining auxiliary support device B in a fixed position against rolling movement relative to track members 10 and 12.

Figure 2:
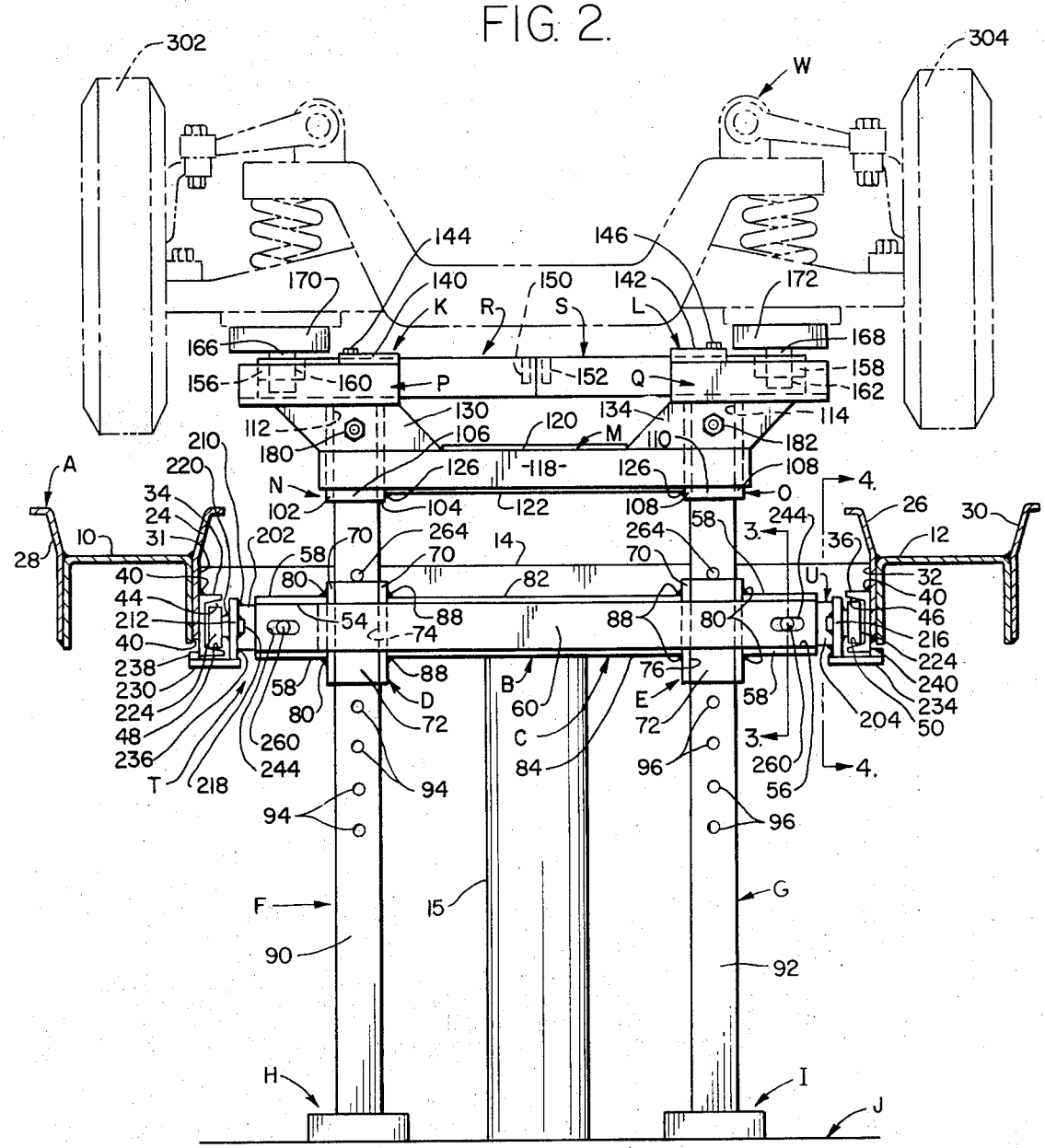
FIG. 2 is an end elevational view looking generally in the direction of arrows 2—2 of FIG. 1 and showing the auxiliary supporting device of the present invention in operative position.

In operation of the device, auxiliary supporting device B is normally positioned in the storage position shown in FIG. 1 with post members F and G extending substantially horizontally and parallel to track members 10 and 12. A vehicle may be driven onto track members 10 and 12. Hoist A is then raised through a power means connected with transverse frame member 14. If it is known that the auxiliary supporting device will be used, pins 260 could have been removed before the vehicle was driven onto tracks 10 and 12. Once hoist A is raised, carrier means C will then rotate for allowing post members F and G to assume a substantially vertical position. Pins 260 are then positioned through holes 244, 246 and 252 in sockets 54 and 56, and projections 202 and 204. A hoist may then be lowered to a position such as shown in FIG. 2 with vehicle engaging means K and L adjusted to engage suitable parts on the undercarriage of vehicle W. Continued downward movement of hoist A, along with tracks 10 and 12, will cause vehicle W to be supported on support pads 170 and 172 with tires 302 and 304 of vehicle W out of contact and above tracks 10 and 12. Continued downward movement of tracks 10 and 12 will move carrier means C downwardly relative to posts F and G to position sockets D and E with the upper edges thereof below selective ones of holes 94 and 96 in post members F and G. Pins 264 may then be inserted through holes 94 and 96 above the upper edges of sockets D and E on carrier means C. This will lock vehicle undercarriage engaging means K and L in a selectively variable position above carrier means C with vehicle tires 302 and 304 raised above tracks 10 and 12. Hoist A may be selectively raised and lowered with vehicle W so suspended with its tires 302 and 304 out of engagement with tracks 10 and 12. Any type of work may then be performed on the vehicle wheels which are freely suspended. Once work is done, hoist A is lowered to disengage the upper edges of sockets D and E from pins 264. Pins 264 are then removed. Hoist A is then moved upwardly until tracks 10 and 12 again engage wheels 302 and 304. Pins 260 are then removed to allow swinging movement of carrier means C to position post members F and G in a substantially horizontal position. Pins 260 may then be reinserted through holes 244, 246 and 250 for latching carrier means C relative to mounting means T and U, and to tracks 10 and 12, with post members F and G in a substantially horizontal storage position. Hoist A may then be lowered into contact with surface J so that vehicle W can be driven from hoist A.

Although only one auxiliary supporting device B has been shown and described, it will be recognized that two of such auxiliary supporting devices would ordinarily be used on hoist A. One auxiliary supporting device B would be positioned on each side of transverse frame member 14. One auxiliary supporting device B would be positionable adjacent the rear axle of a vehicle, while the other auxiliary supporting device B would be positionable adjacent the front wheels of the vehicle.

It will also be recognized that hoist A has been shown only for a general disclosure of the environment with which auxiliary supporting device B is used. Hoist A may take many different forms, including the type wherein tracks 10 and 12 are individually mounted on the rods of hydraulic or pneumatic cylinders. Transverse frame member 14 would then be omitted, and tracks 10 and 12 could be connected adjacent only one of their ends by a transverse frame member for maintaining parallel alignment between the tracks.

The retaining means shown for retaining auxiliary supporting device B against horizontal movement along the hoist may be provided on each mounting means T and U at the opposite end portions of auxiliary supporting device B. In the storage position, slide bars R and S can be moved inwardly so that vehicle engaging pads 170 and 172 will fit between the inner surfaces of tracks 10 and 12. That is, aside from mounting means T and U, entire auxiliary supporting device B has a storage width less than the distance between the inner surfaces of tracks 10 and 12. A pair of auxiliary supporting devices B on a hoist A may be horizontally rolled relative to the hoist to any desired position when they are not being used. This substantially eliminates any interference with normal operation of hoist A by auxiliary supporting devices B.

Although the invention has been described with respect to certain preferred embodiments, it is obvious that equivalent operations and modifications will occur to others skilled in the art upon the reading and understanding of this specification The present invention includes all such equivalent alterations. and modifications and is limited only by the scope of the claims.

Having thus described my invention, I claim:

1. In a vehicle hoist of the type including spaced-apart substantially parallel vehicle wheel supporting tracks and power means for raising and lowering said tracks relative to a supporting surface between a lowermost position and selective raised positions, selectively usable vehicle support means for supporting a vehicle on said tracks with the vehicle wheels raised above said tracks, said support means including carrier means spanning said tracks for carrying said support means on said tracks, a pair of substantially parallel elongated post members spaced-apart in the same direction as said tracks, each of said post members having a longitudinal axis and being slidably carried by said carrier means for sliding movement longitudinally of its axis relative to said carrier means, said post members being positionable in a substantially vertical position substantially perpendicular to said tracks and supporting surface to define bottom post members ends depending from said tracks and engageable with said supporting surface and upper post member ends having vehicle engaging means thereon for engaging selective portions of a vehicle undercarriage, selective locking means for selectively locking said post members against downward sliding movement relative to said carrier means with said vehicle engaging means positioned selectively variable distances above said tracks, and mounting means for mounting said carrier means on said tracks, the improvement comprising; said mounting means swingably mounting said carrier means on a swinging axis extending transversely of said tracks for swinging movement relative to said tracks between a first position wherein said post members are in said substantially vertical position and a second position defining a storage position wherein said post members extend substantially parallel to said tracks, and cooperative latching means on said carrier means and mounting means for selectively latching said carrier means in either of said first and second positions.

2. The device of claim 1 wherein said mounting means is movable relative to said tracks for selective movement of said carrier means parallel to said tracks, and selective retaining means for releasably retaining said mounting means against movement relative to said tracks.

3. The device of claim 1 wherein said carrier means includes opposite sockets facing said tracks and said mounting means includes projections received in said sockets.

4. The device of claim 3 wherein said latching means for selectively latching said carrier means in said first or second positions comprises aligned pin receiving holes in said sockets and projections.

5. The device of claim 4 wherein said holes in said sockets are elongated transversely of said tracks for obtaining limited reciprocal movement of said projections relative to said sockets with a pin received in said aligned pin receiving holes.

6. The device of claim 1 wherein said tracks have opposite inner surfaces facing one another, an elongated channel member secured to each of said inner surfaces, said channel members opening outwardly toward one another transversely of said tracks, said mounting means having rollers thereon received in said channels for rolling movement of said mounting means and carrier means along said channel members parallel to said tracks.

7. The device of claim 6 and further including selective retaining means for releasably retaining said mounting means against movement along said channel members on said rollers.

8. The device of claim 7 wherein said retaining means comprises a wedge member reciprocatingly mounted on said mounting means, handle means for selectively reciprocating said wedge member, cam means mounted on said mounting means for cooperation with said wedge member to wedge said wedge member between said cam means and a surface of at least one of said channel members.

9. The device of claim 1 and further including connecting brace means connecting said upper ends of said post members above said carrier means, said vehicle engaging means being secured to said connecting brace means, said vehicle engaging means being reciprocatable relative to said connecting brace means transversely of said tracks.

10. The device of claim 9 wherein said connecting brace means has slide sockets opening transversely of said tracks, said vehicle engaging means including elongated slide bars slidably received in said slide sockets.

11. A vehicle support device for use with a drive-on type of vehicle hoist having spaced-apart tracks to support a vehicle with its wheels raised above the tracks, said support device including vehicle supporting post means for supporting a vehicle, said post means including a bottom end engageable with a supporting surface and an upper end having vehicle engaging means thereon for engaging selective portions of a vehicle undercarriage, carrier means slidably carrying said post means for longitudinal sliding movement of said post means relative to said carrier means, locking means for selectively locking said post means against downward sliding movement relative to said carrier means with said vehicle engaging means located selectively variable distances above said carrier means, said carrier means having opposite end portions, and mounting means on said opposite end portions for mounting said carrier means on the tracks of a drive-on type of vehicle hoist, the improvement comprising; said carrier means being swingable relative to said mounting means for selectively positioning said post means in a first substantially vertical vehicle supporting position with said bottom end of said post means depending from said carrier means and a second substantially horizontal storage position, and selective latching means for selectively latching said carrier means against swinging movement relative to said mounting means with said post means in either of said first or second positions.

12. The device of claim 11 wherein said mounting means is for movably mounting said support device on the tracks of a drive-on type of vehicle hoist, and selectively operable retaining means on said mounting means for selectively retaining said mounting means against movement relative to the tracks of a drive-on type of vehicle hoist.

13. The device of claim 11 and further including roller means on said mounting means for rollably mounting said support device on the tracks of a drive-on type of vehicle hoist.

14. The device of claim 13 and further including selectively operable retaining means on said mounting means for selectively retaining said support device against rolling movement relative to the tracks of a drive-on type of vehicle hoist.

15. The device of claim 11 wherein said opposite end portions of said carrier means include outwardly opening sockets and said mounting means include projections received in said sockets.

16. The device of claim 15 wherein said latching means for latching said carrier means to said mounting means with said post means in either of said first or second positions comprises aligned pin receiving holes in said sockets and projections.

17. The device of claim 16 wherein at least certain of said holes are laterally elongated for obtaining limited reciprocal movement of said projections relative to said sockets with a pin received in said aligned pin receiving holes.

18. The device of claim 11 wherein said vehicle engaging means on said upper end of said post means includes a pair of spaced-apart support members, said support members being substantially horizontally reciprocable relative to said post means.

19. The device of claim 18 wherein said post means includes brace means above said carrier means, said brace means including outwardly opening opposite slide sockets, and said support members including elongated slide bars slidably received in said slide sockets.

* * * * *